United States Patent Office 3,340,093
Patented Sept. 5, 1967

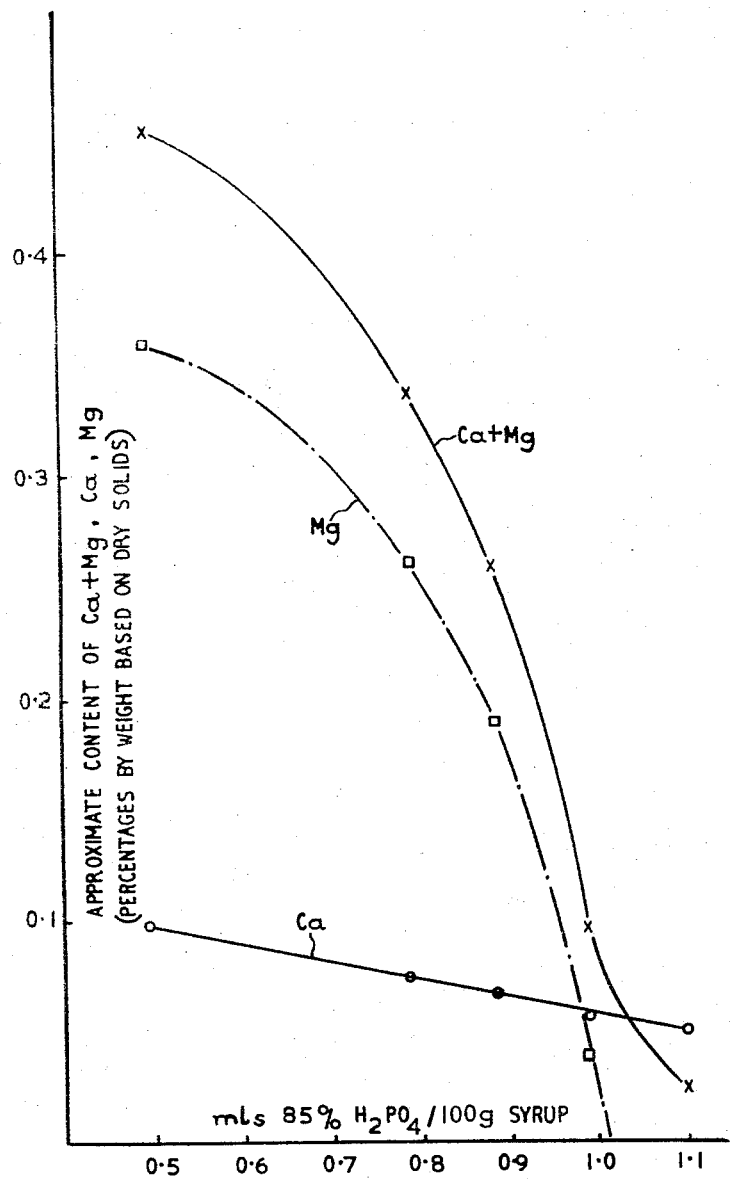

3,340,093
PROCESS FOR REMOVAL OF NON-SUGARS FROM SYRUPS COMPRISING SUGARS AND PURIFIED SYRUPS PRODUCED THEREBY
Beverly Cortis-Jones, Seaforth, New South Wales, and Richard T. Wickham, Lakemba, New South Wales, Australia, assignors to The Colonial Sugar Refining Company Limited, Sydney, New South Wales, Australia, a company of New South Wales
Filed Aug. 17, 1965, Ser. No. 480,427
Claims priority, application Australia, Aug. 20, 1964, 48,370/64; Jan. 21, 1965, 54,229/65
15 Claims. (Cl. 127—30)

This invention relates to the removal of non-sugars from syrups derived from sugar cane, hereinafter referred to as "cane syrups." Particularly, but not exclusively, it relates to the removal of selected non-sugars from low-grade mill syrups or low-grade invert syrups derived therefrom.

In the past, difficulties have been experienced in the recovery of uncontaminated sugars from low-grade mill syrups owing to the type of impurities present in such syrups.

Major impurities in aqueous dilutions of low-grade mill syrups include sedimentables (colloidal and suspended material in very finely divided form) and soluble salts (comprising inorganic salts of mono- and di-valent cations and salts of organic acids).

According to one method of the prior art, sedimentable material is removed from diluted low-grade mill syrup in a preliminary step by subjecting it to high-speed centrifuging. Selected soluble material is then removed from the resulting syrup by passing it through a column charged with a suitable ion exchange resin.

A disadvantage of this method is related to the fact that optimum running of the column can only be ensured in the absence of sedimented material. Inasmuch as continued dilution of syrup (which occurs during passage through a column) may result in an increased sedimented content, it is necessary according to this method first to dilute the syrup to a very low concentration (thus ensuring elimination of major sedimentables in the centrifuging step). If the added water has to be removed subsequently (a usual requirement), the cost of the operation is substantially increased.

A further disadvantage of this method is that removal of the high content of soluble salts may be expensive and only partly successful. Thus, if ion exchange processes are used, regeneration of the exchangers requires uneconomic amounts of acid and alkali; on the other hand, the alternative process of ion exclusion is not economical in the presence of relatively high concentrations of divalent ions (e.g. about 0.5% of total solids) and is therefore difficult to apply to low-grade mill syrups.

According to a method disclosed in Australian Patent 142,775 sedimentable material is removed as a first precipitate from high-grade sugar-containing juice by acidifying in the cold with sulphurous acid and phosphoric acid to a pH of 3.5 to 2.5. The pH of the supernatant juice is then returned to approximate neutrality by means of calcium hydroxide; the mixture is boiled and a second precipitate settles out consisting mainly of insoluuble calcium salts (sulphites and phosphates).

A clear disadvantage of the method of this prior patent is that the product juice is still contaminated with divalent metal cation impurity. This is particularly true when the method is applied to low-grade syrups. In particular, the level of magnesium in the juice is unreduced.

It is an object of the present invention to provide an economical process for the removal of both sedimentable impurities and divalent metal cation impurities (calcium and magnesium) from cane syrups. It is a more particular object of the invention to remove such impurities from low-grade mill syrups or from low-grade invert syrups derived therefrom.

The process of the invention overcomes the disadvantages of those methods known hitherto, and yields a clear syrup which is particularly suitable for further purification by known means, e.g. ion exclusion techniques.

Broadly, the invention provides a process for the removal from cane syrups of (a) sedimentable impurity and (b) divalent metal cation impurity comprising both calcium and magnesium, said process including the following steps:

(1) Lowering the pH of the syrup to below 4 by the addition of a selected acid capable of forming an insoluble salt with calcium ions;
(2) Removing suspended solids comprising flocculated and precipitated material;
(3) In the presence of orthophosphate and ammonium ions, raising the pH to about 7 by the addition of a suitable base;
(4) Removing precipitated material.

In step (1) of this process, sedimentable material is flocculated and calcium impurity is precipitated by the anion of the selected acid. In step (3), magnesium impurity is precipitated as the highly insoluble salt, magnesium ammonium phosphate.

Removal of flocculated sedimentable material and inorganic precipitates is conveniently carried out by means of a pressure filter (in which case, a filter aid may be used) or a continuous centrifuge operating at moderate centrifugal forces. To facilitate this operation, it is preferred to employ as starting material a syrup comprising not more than 60% by weight of dissolved solids. Low-grade mill syrups are therefore usually diluted somewhat with water prior to performing the invention.

It has been found suitable to lower the pH of the syrup in step (1) to about 3. This figure, however, is given merely by way of illustration, and it will be understood that other pH values may be chosen according to the desired properties of the product.

Sulphuric and orthophosphoric acids are examples of acids suitable both for lowering pH and precipitating calcium impurity. Of these, the former is preferred on economic grounds, but the latter enables a more complete removal of calcium. It is also possible to use a mixture of sulphuric acid with a phosphate salt (e.g. superphosphate).

Unless it is desired to perform other operations (e.g. acid catalysed inversion of sucrose), it is possible to conduct step (2) almost immediately after acidification (e.g. within 15 minutes). In some cases, however, more complete flocculation and precipitation may be achieved by allowing the mixture to stand (e.g. for an hour).

Suitably, the pH may be raised to about 7 in step (3) by adding ammonium hydroxide per se. In cases where the magnesium content of the syrup is not high it may be preferred to raise the pH of the mixture by the addition of (e.g.) a combination of sodium carbonate and ammonium hydroxide.

If phosphoric acid has not been used in step (1) there must be a subsequent addition of phosphate ions, suitably after step (2).

It will be understood that it is preferred in step (1) to add enough acid to precipitate as much of the calcium impurity as possible. Similar considerations dictate the desired concentrations of ammonium and phosphate ions present in step (3), i.e. it is preferred that these be present in sufficient amounts to precipitate as much of the magnesium impurity as possible.

In the following table details of solubilities (in water at ambient temperature unless otherwise indicated) of various inorganic calcium and magnesium compounds are given. (These solubilities are taken from the Handbook of Chemistry and Physics, 45th edition, Robert C. Weast et al., pub. The Chemical Rubber Company, Cleveland, Ohio.)

| Compound: | Solubility, g./100 ml. |
|---|---|
| (a) Calcium orthophosphate, $Ca_3(PO_4)_2$ | 0.002. |
| (b) Calcium sulphate [1], $CaSO_4$ | 0.209 at 30° C., 0.1619 at 100° C. |
| (c) Calcium sulphite, $CaSO_3 \cdot 2H_2O$ | 0.0043. |
| (d) Magnesium ammonium phosphate [2], $MgNH_4PO_4 \cdot 6H_2O$ | 0.0231 at 0° C., 0.0195 at 80° C. |
| (e) Magnesium carbonate, $MgCO_3$ | 0.0106. |
| (f) Magnesium hydroxide $Mg(OH)_2$ | 0.0009. |
| (g) Magnesium monohydrogen orthophosphate, $MgHPO_4 \cdot 7H_2O$ | 0.3, 0.2 when "hot." |
| (h) Magnesium orthophosphate, $Mg_3(PO_4)_2 \cdot 4H_2O$ | 0.0205, 0.0205. |
| (i) Magnesium oxalate, $MgC_2O_4 \cdot 2H_2O_4$ | 0.07. |
| (j) Magnesium sulphite, $MgSO_3 \cdot 6H_2O$ | 1.25. |
| (k) Magnesium sulphate, $MgSO_4$ | 26 at 0° C. |

[1] Calcium sulphate is "soluble" in the presence of ammonium ions.
[2] Magnesium ammonium phosphate is "very soluble" in dilute acid.

It has been observed above that it is preferred on economic grounds to use at least some sulphuric acid in step (1) of the defined process, thus precipitating at least some calcium as the sulphate. Since this salt is soluble in the presence of ammonium ions (see table), it is obvious that the maximum removal of calcium cannot be achieved unless ammonium ions are absent from the mixture during steps (1) and (2).

Of the salts listed in the table, we have found that—for a variety of reasons—the ammonium salt (d) is the only form in which magnesium can be removed satisfactorily from cane syrups.

It is obvious that magnesium cannot be removed satisfactorily from these syrups in certain forms (e.g. oxalate formation involves toxicity hazards, and the sulphate or sulphite is too soluble). On the other hand, while it would be expected for magnesium to be precipitated readily from cane syrups in the form of various water-insoluble compounds (e.g. the phosphate or carbonate), we have found that in practice nearly all of these compounds are precipitated with difficulty (if at all) from such solutions.

The behaviour of magnesium ammonium phosphate is itself surprising in the present invention. This salt is normally very soluble in dilute acids (see table), but we have found that it is precipitated readily from sugar syrups at pH values below 7. Further, we have found that the solubility characteristics of the salt in syrups are temperature-reversed with respect to those in water. Thus, the salt has lower solubility in hot water than in cold water (See table), but it was found that it is best precipitated from syrups in the cold.

The product resulting from the process of the invention is a clear syrup essentially free of insolubles at any dilution. The residual concentration of divalent cations is so low that interference with a subsequent column purification process (e.g. ion exclusion) will be minimal. As a result, most of the remaining inorganic matter (principally monovalent cations of sodium, potassium and ammonium) and organic non-sugars (including colour factors) can be removed without difficulty.

For many applications, it is a matter of indifference whether or not the sugar derived from mill-syrups is sucrose or invert sugar. Since a syrup comprising invert sugar (small molecules of fructose and glucose) is better adapted for purification by ion exclusion than a syrup comprising sucrose (a sugar of comparatively large molecular size), it is preferred in many cases to invert the sucrose content of syrups prior to purification by ion exclusion.

Inversion of sucrose is catalysed by acid, and the process is accelerated markedly by heating. When sucrose-containing syrups are purified by the present invention, step (1) of the process can be adapted readily to effect inversion by including retention under heat. By varying the retention period and temperature, the degree of inversion can be controlled.

While this method has proved successful in the preparation of invert sugar from cane syrups (e.g. low-grade mill syrup), certain disadvantages have been apparent. For example, heat-accelerated inversion at low pH requires the use of holding vessels fabricated of expensive non-corrodible materials (e.g. stainless steel); furthermore, these conditions are liable to favour the formation of unwanted degradation products.

In an alternative method, invert sugar without degradation products may be prepared from cane syrups by performing the inversion by invertase catalysis at a pH selected from the range about 5 to about 7, i.e. at the natural pH of the syrups and the optimum pH for the enzyme. Most conveniently, this inversion is carried out as a preliminary step before removing colloidal and divalent cationic impurity by the method of the invention. Since inversion conditions are not corrosive it is possible to use holding vessels fabricated of suitable inexpensive materials (e.g. mild steel).

In practising a preliminary inversion according to this method, the aqueous low-grade mill-syrup at its natural pH (5–7) is brought to a concentration of dissolved solids within the range 60–70% by weight and active invertase is added. The temperature of the mixture is then raised to about 60–65° C. to accelerate the reaction and this temperature is maintained for sufficient time to ensure substantially complete inversion, e.g. about 24 hours. It will be understood that the concentration of the syrup is not necessarily restricted to the specified range; however, at higher than 70% solids the inversion is slower, while at less than 60% solids other enzymatic action is liable to occur (e.g. alcohol may be formed by enzyme impurities in commercial invertase).

In each of the following examples the starting material was a low-grade mill syrup containing 1.89 g. of calcium and magnesium (calculated as calcium) per 100 g. of soluble solids.

*Example 1*

Mill syrup (500 g.) was diluted with water (150 ml.) to give a concentration of dissolved solids of 55–58% by weight, and this was then mixed with sulphuric acid (165 ml., 2 N). The resulting mixture, of pH about 3, was allowed to stand for 1 hour at room temperature. Inversion was negligible. It was then centrifuged at 6000 r.p.m. for 15 minutes. Phosphoric acid (5.5 g. of 85% acid) was added and the mixture was then brought to pH about 5 by the additional of sodium carbonate solution (5.8 ml. of 40% solution). Concentrated ammonium hydroxide solution (4.7 ml.) was then added, thus raising the pH to about 7.5. The mixture after filtration yielded a solution containing 0.24 g. of calcium and magnesium (calculated as calcium) per 100 g. of solids. This solution remained clear on dilution, and was suitable for further purification by ion exclusion.

Example 2

Mill syrup (200 g.) was diluted with water (55 ml.) to give a concentration of dissolved solids of about 50% by weight and this was then mixed with sulphuric acid (60 ml., 2 N) and superphosphate (4 g.). The resulting mixture, of pH about 3, was heated in a non-corrodible container at 80° C. for 4½ hours under gentle agitation. Inversion was very complete. The hot reaction mixture was centrifuged as in the first example to remove flocculated and precipitated matter. Phosphoric acid (2.4 g. of 85% acid) was added to the supernatant liquor, and the pH value was then raised to 7.5 by the addition of concentrated ammonium hydroxide. After cooling to substantially ambient temperature, the mixture was filtered to yield a liquor containing 0.11 g. of calcium and magnesium (calculated as calcium) per 100 g. of solids. A sample remained clear on dilution and was very suitable for subsequent removal of salts by ion exclusion.

Example 3

Mill syrup (1100 g.) was treated in the manner of Example 2 but without the addition of superphosphate. After the initial centrifuging, the liquor was divided into portions; aliquot parts containing the equivalent of 200 g. of syrup were treated with varying amounts of phosphoric acid, neutralized with concentrated ammonium hydroxide, cooled to substantially ambient temperature and filtered. The content of calcium plus magnesium and of calcium alone was determined in each filtrate; the content of magnesium was determined by difference. The accompanying drawing illustrates the relationship of calcium plus magnesium content to phosphoric acid used; it is noted that the fall in total calcium/magnesium ion content was due mainly to a sharp drop in the magnesium level with increasing additions of phosphoric acid.

Example 4

Mill syrup (3.3 kg.) of concentration 78% solids was treated with water (750 ml.) to reduce the concentration to about 65% solids by weight. Active yeast invertase preparation (1.5 g.) was mixed thoroughly with the syrup, which was then heated to about 65° C. and maintained at this temperature for 24 hours. Sulphuric acid (1,000 ml., 1.3 N), was then heated to 65° C. and added to the inverted mixture, thus lowering the pH to 2.5. Flocculated colloidal material and precipitated sulphate material were removed almost immediately in a continuous centrifuge (De Laval Model B1324A). The resulting supernatant liquor was then treated with phosphoric acid (45 g. of 85% acid), the pH was raised to 7.5 by the addition of ammonium hydroxide and the mixture was allowed to cool to substantially ambient temperature. This material filtered very rapidly at low pressure to give a filtrate containing as little as 0.04% divalent cations (calculated as calcium) and about 1.5% non-inverted sugar (percentages based on solids content).

We claim:

1. A process for the removal from cane syrups of (a) sedimentable impurity and (b) divalent metal cation impurity comprising both calcium and magnesium, said process including the following steps:
    (1) lowering the pH of the syrup to below 4 by the addition of a selected acid capable of forming an insoluble salt with calcium ions;
    (2) removing suspended solids comprising flocculated and precipitated material;
    (3) in the presence of orthophosphate and ammonium ions, raising the pH to about 7 by the addition of a suitable base;
    (4) removing precipitated material.

2. A process according to claim 1, in step (1) of which the pH of the syrup is lowered to below 4 by the addition of sulphuric acid.

3. A process according to claim 1, in step (1) of which the pH of the syrup is lowered to below 4 by the addition of orthophosphoric acid.

4. A process according to claim 1, in step (1) of which the pH of the syrup is lowered to below 4 by the addition of a mixture of a sulphuric acid and superphosphate.

5. A process according to claim 1 in step (1) of which the pH of the syrup is lowered to about 3.

6. A process according to claim 1 in which said cane syrups contain not more than 60% by weight of dissolved solids and in which removal of suspended solids in step (2) is carried out by filtering.

7. A process according to claim 1 in which said cane syrups contain not more than 60% by weight of dissolved solids and in which removal of suspended solids in step (2) is carried out by centrifuging.

8. A process according to claim 1 in step (3) of which the pH is raised to about 7 by the addition of ammonium hydroxide.

9. A process according to claim 1 in which step (3) is carried out at substantially ambient temperature.

10. Purified syrups when prepared by a process according to claim 1.

11. A process for the removal of selected impurities from low-grade mill syrups diluted to not more than 60% by weight of dissolved solids, said selected impurities consisting of (a) sedimentable impurity and (b) divalent metal cation impurity comprising both calcium and magnesium, and said process including the following steps:
    (1) lowering the pH of the syrup to about 3 by the addition of sulphuric acid;
    (2) removing suspended solids comprising flocculated and precipitated material;
    (3) adding orthophosphoric acid and at substantially ambient temperature raising the pH to about 7 by the addition of ammonium hydroxide;
    (4) removing precipitated material.

12. A process for the removal of selected impurities from low-grade mill syrups diluted to not more than 60% by weight of dissolved solids, said selected impurities consisting of (a) sedimentable impurity and (b) divalent metal cation impurity comprising both calcium and magnesium, and said process including the following steps:
    (1) lowering the pH of the syrup to about 3 by the addition of a mixture of sulphuric acid and superphosphate, then heating the resulting mixture in a non-corrodible container until the sucrose content is substantially inverted;
    (2) removing suspended solids comprising flocculated and precipitated material;
    (3) adding orthophosphoric acid to the hot syrup and raising the pH to about 7 by the addition of ammonium hydroxide;
    (4) removing precipitated material at substantially ambient temperature.

13. A process for the removal of selected impurities from invert syrups comprising not more than 60% by weight of dissolved solids, said invert syrups being derived in a preliminary step from low-grade mill syrups; said preliminary step including inverting the sucrose content of said low-grade mill syrups by invertase catalysis; said selected impurities consisting of (a) sedimentable impurity and (b) divalent metal cation impurity comprising both calcium and magnesium, and said process including the following steps:
    (1) lowering the pH of the syrup to below 4 by the addition of a selected acid capable of forming an insoluble salt with calcium ions;
    (2) removing suspended solids comprising flocculated and precipitated material;
    (3) in the presence of ortho-phosphate and ammonium ions, raising the pH to about 7 by the addition of a suitable base;
    (4) removing precipitated material.

14. Purified syrups when prepared by a process according to claim 13.

15. A process for the removal of selected impurities from invert syrups comprising not more than 60% by weight of dissolved solids, said invert syrups being derived in a preliminary step from low-grade mill syrups; said preliminary step including inverting the sucrose content of said low-grade mill syrups by yeast invertase catalysis at a pH within the range 5 to 7, at a dissolved solids concentration within the range 60–70% by weight, and at a temperature of between 60–65° C.; said selected impurities consisting of (a) sedimentable impurity and (b) divalent metal cation impurity comprising both calcium and magnesium, and said process including the following steps:

(1) lowering the pH of the syrup to about 3 by the addition of sulphuric acid at a temperature of between 60–65° C.;

(2) removing suspended solids comprising flocculated and precipitated material;

(3) adding orthophosphoric acid and at substantially ambient temperature raising the pH to about 7 by the addition of ammonium hydroxide;

(4) removing precipitated material.

References Cited
UNITED STATES PATENTS

| | | | |
|---|---|---|---|
| 152,126 | 6/1874 | Lagrange | 127—48 |
| 1,897,424 | 2/1933 | Foster | 127—51 |

MORRIS O. WOLK, *Primary Examiner.*

M. E. ROGERS, *Assistant Examiner.*